United States Patent
Cabrera et al.

(10) Patent No.: US 7,415,327 B2
(45) Date of Patent: Aug. 19, 2008

(54) COMPUTERISED FLIGHT MANUAL AND METHOD FOR DYNAMIC CONTROL OF SUCH A FLIGHT MANUAL

(75) Inventors: Olivier Cabrera, Aureville (FR); Bernard Deret, Fonsegrives (FR); Laurent Fonteneau, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/746,819

(22) Filed: May 10, 2007

(65) Prior Publication Data

US 2007/0276554 A1 Nov. 29, 2007

(30) Foreign Application Priority Data

May 24, 2006 (FR) .................................. 06 04720

(51) Int. Cl.
*G06F 17/00* (2006.01)
(52) U.S. Cl. .................................. 701/3; 701/9; 701/14
(58) Field of Classification Search .............. 701/3–14, 701/36; 244/75 R
See application file for complete search history.

(56) References Cited

U.S. PATENT DOCUMENTS 6,606,544 B2 * 8/2003 Glenn et al. .................... 701/3
7,212,942 B2 * 5/2007 Vollum ........................ 702/127

OTHER PUBLICATIONS

AIRBUS: "PEP & LTS, Performance Engineers' Programs & Load & Trim Sheet software" [Online] http://www.content.airbusworld.com/SITES/Customer_services/html/acrobat/pep_lts.pdf, XP002415176, Mar. 2003, pp. 1-23.

Maher Khouzam: "Computerizes Aeroplane Flight Manual Performance Systems", Advisory Circular (AC), [Online] URL:http://www.tc.gc.ca./civilaviation/certification/guidance/525/pdf/525-019.pdf, XP002415181, No. 1, Dec. 1, 2004, pp. 1-9.

Maher Khouzam: "Système informatisé d'établissement des performances des avions", Circulaire Consultative (CC), [Online] URL:http://www/tc.gc.ca/AviationCivile/certification/reference/525/525-019.htm, XP002415185, Sep. 12, 2006, pp. 1-3.

Maher Khouzam: "Appendice 1-Manuel de vol de l'avion informatisé", Circulaire Consultative (CC), [Online] URL:http://www.tc.gc.ca/AviationCivile/certification/reference/525/525-019a.htm, XP2415185, Jan. 17, 2007, pp. 1-8.

* cited by examiner

*Primary Examiner*—Richard M. Camby
(74) *Attorney, Agent, or Firm*—Oblon, Spivak, McClelland, Maier & Neustadt, P.C.

(57) ABSTRACT

Method for dynamic control of the performance of an aircraft computed on the basis of a real aircraft data input file and a computation data input file, using a computerised flight manual running on a terminal equipped with a commercial operating system, which comprises the following steps:
- a step of computing the performance of the aircraft on the basis of said real aircraft data input file, and said computation data input file, and obtaining at least one first result file,
- a step of computing reference performances on the basis of a reference data input file, and obtaining at least one third result file, which step is performed in parallel with the previous step,
- a first step of comparing the at least one third result file with the at least one reference result file, so as to detect any malfunction of the operating system with the application of numerical margins tolerated on the results of the result files,
- a step of deleting the at least one first result file and sending an error message to the user if the result of this first comparison step is negative.

18 Claims, 1 Drawing Sheet

US 7,415,327 B2

COMPUTERISED FLIGHT MANUAL AND METHOD FOR DYNAMIC CONTROL OF SUCH A FLIGHT MANUAL

TECHNICAL FIELD

This invention relates to a computerised flight manual and a method for dynamic control of such a flight manual, for a predetermined aircraft.

To simplify the description, we will discuss by way of example an airplane-type aircraft below.

PRIOR ART

As described in the document referenced [1] at the end of the description, the purpose of a flight manual is to be a reference source of information considered to be necessary for the safe operation of an airplane.

A computerised flight manual is a certified program using certified databases, including a computation module, a user interface and a database, all certified by the airworthiness authorities.

The computerised flight manual may be certified by the EASA ("European Aviation Safety Agency") for operation on a PC-type computer ("Personal Computer") equipped with a commercial operating system, such as Windows. It is software required for the certification of each airplane, necessary for the operation thereof, in preparation for the flight.

Such a computerised flight manual can be provided to airlines in the form of a software program. It makes it possible to compute the "low speed" performance of the airplane (take-off and landing phases), using the aerodynamic, engine and geometric data of the airplane. The main information provided by it includes the relationship between the ground on take-off (or landing) and the characteristic speeds that the pilot uses to take off (or land), and the performance of the airplane: length of take-off (or landing), climb (or descent) gradients, accelerate-stop distance, and so on.

The operation of this software is shown diagrammatically in FIG. 1. An airplane file 10, which contains aeronautic, engine and other data, as well as a computation file 11, which contains the data describing the computation to be performed, are entered into a computation module 12, which generates result files 13 giving the airplane's performance.

For airplanes preceding the Airbus A380-type airplane, the certification constraints of the computerised flight manual allowed for the use of a Windows-type operating system without any particular constraints other than tests before certification, in order to demonstrate the successful operation of the computerised flight manual in its environment.

Since the Airbus A380-type airplane, this computerised flight manual must satisfy stricter certification requirements defined in the International reference guidelines RTCA D0178B level C, which apply to the airplane performance computation module, and the operating system, with regard to its operation safety objective, so as to prevent it from supplying erroneous information to the user. These guidelines indeed describe the requirements making it possible to objectively determine the acceptability of a software program on-board an airplane. The acceptability criteria are defined according to the criticality of the software program, i.e. the impact that an error of this software could have on safety. The levels of criticality and therefore development are defined from level A (most critical) to level E (least critical). Level C corresponds to an impact with so-called "major" repercussions on safety.

Such requirements involve:

D0178B level C certification of the operating system used, or the use of a level C operating system, or the implementation of means for dynamic surveillance of the operating system making it possible to obtain an equivalent level of safety.

At present, no version of the Windows operating system is certified at level C of the D0178B certification. In addition, such a certification at such a level is not reliable, since no source code or test specification/development elements are available.

The retirement of the Windows operating system and the use of an operating system certified at level C would involve considerable development or implementation costs both for the developer and for the clients (adaptation of the procedure that currently enables their use in an open environment).

The invention relates to a method for dynamic control of this computerised flight manual so as to avoid certifying the operating system of the workstation on which it is running, which enables the Windows operating system to be used, while implementing dynamic control means making it possible to provide a level of reliability that the EASA deems adequate.

DESCRIPTION OF THE INVENTION

The invention relates to a method for dynamic control of the performance of an aircraft computed on the basis of a real aircraft data input file and a computation data input file, using a computerised flight manual running on a terminal equipped with a commercial operating system, which comprises the following steps:

a step of computing the performance of the aircraft on the basis of said real aircraft data input file, and said computation data input file, and obtaining at least one first result file, a step of computing reference performances on the basis of a reference data input file, and obtaining at least one third result file, which step is performed in parallel with the previous step, a first step of comparing the at least one third result file with the at least one reference result file, so as to detect any malfunction of the operating system with the application of numerical margins tolerated on the results of the result files, a step of deleting the at least one first result file and sending an error message to the user if the result of this first comparison step is negative.

In an advantageous embodiment, the method of the invention also comprises:

a second step of computing the performance of the aircraft on the basis of the real aircraft data input file and the computation data input file, and obtaining at least one second result file, a second step of comparing the at least one first result file and the at least one second result file, a step of deleting the first and second result files and sending an error message to the user if the result of this second comparison step is negative.

The method of the invention advantageously also includes:

a preliminary step of verifying data integrity control algorithms established on modules for computing the flight manual, and on configuration files used by it, a step of verifying, after reading the input files, data integrity control algorithms established on these input files, prior to each computation step, a step of verifying, after writing the result files, data integrity control algorithms established on these input files, after each computation step, a step of checking the comparison module performing the second comparison step, before it performs said second comparison step.

The method of the invention is advantageous because it makes it possible to avoid developing or implementing a certified D0178B level C operating system, which would be very expensive. In addition, it enables the client companies to maintain a procedure for an Airbus A380-type airplane consistent with that of the other Airbus-type airplanes that they have: the computerised flight manual can continue to be used in an open environment, for example on a commercial PC-type computer equipped with the Windows operating system.

The invention also relates to an aircraft using a computerised flight manual running on a terminal equipped with a commercial operating system, which comprises:

a first module for computing aircraft performance on the basis of a real aircraft data input file, and a computation data input file, and obtaining at least one first result file, a third module for computing reference performances on the basis of a reference data input file, and obtaining at least one third result file, a first module for comparing the at least one third result file with the at least one reference result file, so as to detect any malfunction of the operating system with the application of numerical margins tolerated on the results of the result files, a module for deleting the first result files and sending an error message to the user if the result of this comparison is negative.

This aircraft advantageously also includes:

a second module for computing aircraft performance on the basis of the real aircraft data input file and the computation data input file and obtaining at least one second result file, a second module for comparing the at least one first result file and the at least one second result file, a module for deleting the first and second result files and sending an error message to the user if the result of this comparison is negative.

This aircraft advantageously includes:

a module for verifying data integrity control algorithms established on modules for computing the flight manual, and on configuration files used by it, a module for verifying, after reading the input files, data integrity control algorithms established on these input files, prior to each computation step, a module for verifying, after writing the result files, data integrity control algorithms established on these input files, after each computation step, a module for checking the comparison module performing the second comparison step, before it performs said second comparison step.

Each data integrity control algorithm is a 32-bit checksum. The operating system can be the Windows system. The aircraft can be an airplane.

DETAILED DESCRIPTION OF SPECIFIC EMBODIMENTS

Figure 1:
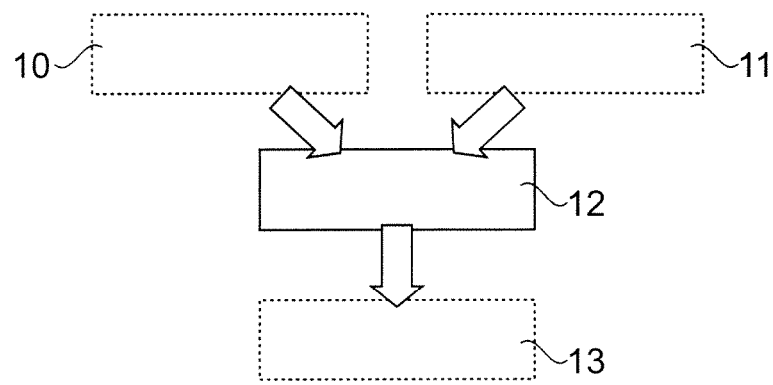
FIG. 1 shows the operation of a computerised flight manual of the prior art.
Figure 2:
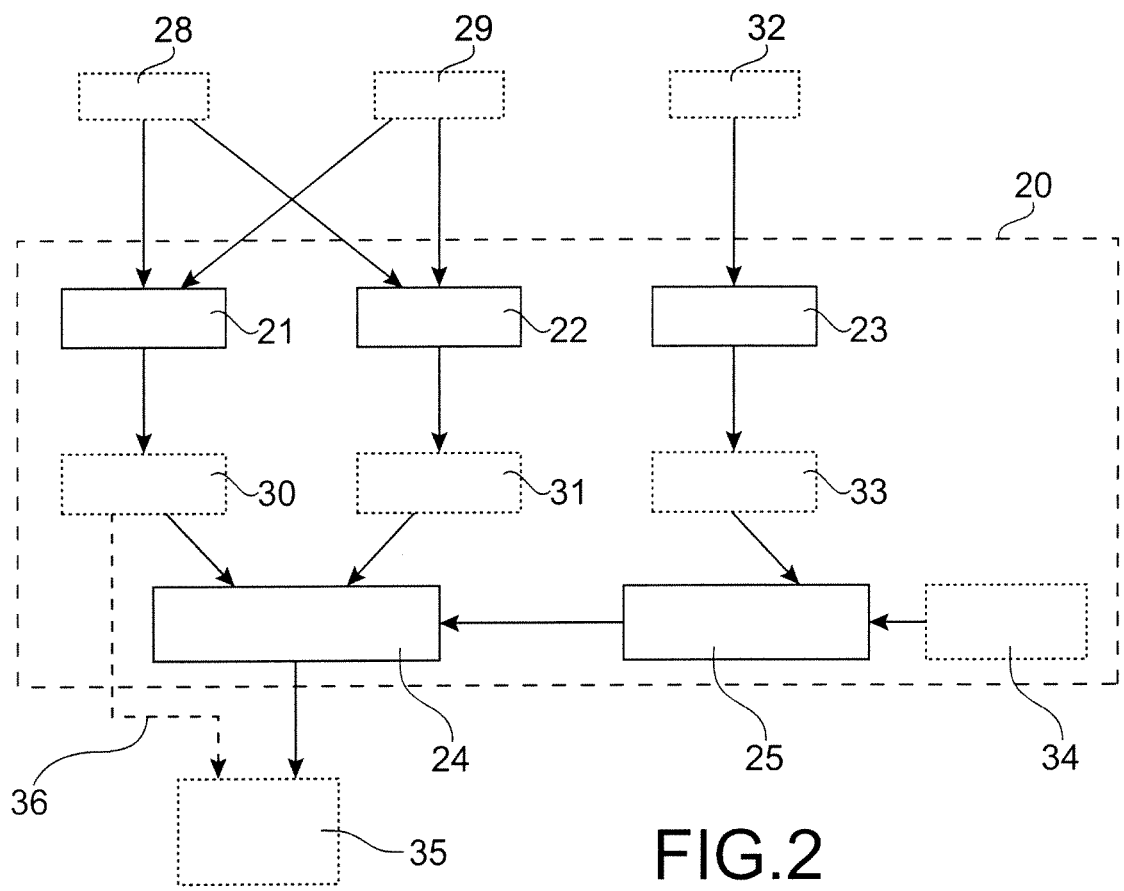
FIG. 2 shows the operation of the computerised flight manual of the invention.

As shown in FIG. 2, the computerised flight manual of the invention includes:

a first module 21 for computing airplane performance on the basis of a real aircraft data input file 28, and a computation data input file 29, and obtaining at least one first result file 30, advantageously, a possible second module 22 for computing aircraft performance on the basis of these two same files 28 and 29, generating at least one second result file 31, a third module 23 for computing reference performances on the basis of a reference data input file 32, and obtaining at least one third result file 33, advantageously, a second module 24 for comparing the at least one first result file 30 and the at least one second result file 31, generating at least one output file 35 corresponding to the first and second result files 30 and 31, if the comparison is positive, a first comparison module 25 connected to this second comparison module 24, for comparing the at least one third result file 33 and a reference result file 34.

The arrow 36 shown in FIG. 2 corresponds to a copy of the output files 30 in the output files 35, if all of the diagnostics provided by the controls defined above and below are positive. Otherwise, this copy is not made and the output files 30 and 31 are deleted, and the user has no output to manage.

According to the invention, the method for dynamic control, for an airplane, of such a computerised flight manual operating on a terminal using a given operating system, comprises the following steps:

a first step of computing airplane performance on the basis of the real aircraft data input file 28, and a computation data input file 29, and obtaining at least one first result file 30, a step of computing reference performances on the basis of a reference data input file 32, and obtaining at least one third result file 33, this step being performed in parallel with the previous step, a first step of comparing this at least one at least one third result file 33 and at least one reference result file 34 so as to detect any malfunction of the operating system, with the application of "numerical margins" tolerated (for an insignificant difference) on the results, in order to determine the acceptability of the result files 30, a step of deleting the first result files 30 and sending an error message to the user if the result of this first comparison step is negative.

Such a comparison with a reference case of which the results are available makes it possible to validate the integrity of the operating environment if the operating system were to systematically modify the outputs, or systematically produce the same error.

In an advantageous embodiment, the method of the invention also comprises:

a second step of computing aircraft performance on the basis of the real aircraft data input file 28 and the computation data input file 29, and obtaining at least one second result file 31, a second step of comparing the at least one first result file 30 and the at least one second result file 31 so as to detect any data modifications during a computation due to a malfunction of the operating system, or the influence of another application running at the same time, a step of deleting the first and second result files and sending an error message to the user if the result of this second comparison step is negative.

The two computation modules 21 and 22 are identical in their content, operate in parallel and occupy a different memory space. If there is a malfunction of the operating system, or an undesired interaction of another process ("side effect"), the result files 30 and 31 are then different. The result is not displayed. An error message is transmitted to the user (with the probability of the same error being produced for both computations indeed being very low).

The method of the invention is a method for dynamic control, i.e. active in real-time, of a computerised flight manual implemented in order to detect a malfunction of an operating system in the context of the use of certain functionalities, for example the computation of the airplane landing or take-off length.

An analysis of the risks associated with the use by the computerised flight manual of an operating system lower than level C shows that the possible impacts on the computation results are related:

- to the integrity of the input and output files,
- to the management of data in storage,
- to the integrity of the processes in progress, during computations performed by the computation module,
- to the integrity of the computation software used, before performing any computation.

In an advantageous embodiment of the invention, the computation modules 21, 22 and 23, and the configuration files, i.e. the files that contain the data necessary for successful operation of the flight manual, are therefore equipped with data integrity control algorithms, for example checksums. These algorithms are checked when the computerised flight manual is called upon, making it possible to verify the integrity of the application and its use on the user terminal.

The input files 28, 29 and 32 can also be equipped with such algorithms. After the reading of these files 28, 29 and 32 and before their use by the computation modules 21, 22 and 23, the algorithms of these files are verified, which makes it possible to verify the integrity of these files during the reading phase by each computation module, with the reading function of the operating system thus being controlled.

To check the successful operation of the writing function of the output files of the operating system, the result files 30, 31 and 33 can also be equipped with such algorithms. Each algorithm is computed by the corresponding computation modules 21, 22 and 23, then written in the corresponding files. These files are then reviewed, and their algorithm is computed and compared with that read. If the comparison is not good, the result files are deleted and an error message is sent to the user.

The second comparison module 24 can be checked before use, by comparing two different files and two reference files.

REFERENCES

[1] "FM -Flight Manual" "PEP & LTS: Performance Engineer's Programs & Load & Tune Sheet Software", February 2003, (address: http://www.content.airbusworld.com/SITES/Customer services/html/09 04 01 esolutions.htm

The invention claimed is:

1. Method for dynamic control of the performance of an aircraft computed on the basis of a real aircraft data input file and a computation data input file, using a computerised flight manual running on a terminal equipped with a commercial operating system, which comprises the following steps:

a step of computing the performance of the aircraft on the basis of said real aircraft data input file, and said computation data input file, and obtaining at least one first result file, a step of computing reference performances on the basis of a reference data input file, and obtaining at least one third result file, which step is performed in parallel with the previous step, a first step of comparing the at least one third result file with the at least one reference result file, so as to detect any malfunction of the operating system with the application of numerical margins tolerated on the results of the result files, a step of deleting the at least one first result file and sending an error message to the user if the result of this first comparison step is negative.

2. Method according to claim 1, which comprises:

a second step of computing the performance of the aircraft on the basis of the real aircraft data input file and the computation data input file, and obtaining at least one second result file, a second step of comparing the at least one first result file and the at least one second result file, a step of deleting the first and second result files and sending an error message to the user if the result of this second comparison step is negative.

3. Method according to claim 1, which comprises:

a preliminary step of verifying data integrity control algorithms established on modules for computing the flight manual, and on configuration files used by it.

4. Method according to claim 1, which comprises:

a step of verifying, after reading the input files, data integrity control algorithms established on these input files, prior to each computation step.

5. Method according to claim 4, which comprises:

a step of verifying, after writing the result files, data integrity control algorithms established on these input files, after each computation step.

6. Method according to claim 2, which comprises:

a step of checking the comparison module performing the second comparison step, before it performs said second comparison step.

7. Method according to claim 3, wherein each data integrity control algorithm is a 32-bit-type checksum.

8. Method according to claim 1, wherein the operating system is the Windows system.

9. Method according to claim 1, wherein the aircraft is an airplane.

10. Aircraft using a computerised flight manual operating on a terminal equipped with a commercial operating system, which comprises:

a first module for computing aircraft performance on the basis of a real aircraft data input file, and a computation data input file, and obtaining at least one first result file, a third module for computing reference performances on the basis of a reference data input file, and obtaining at least one third result file, a first module for comparing the at least one third result file with the at least one reference result file, so as to detect any malfunction of the operating system with the application of numerical margins tolerated on the results of the result files, a module for deleting the first result files and sending an error message to the user if the result of this comparison is negative.

11. Aircraft according to claim 10, which comprises:

a second module for computing aircraft performance on the basis of the real aircraft data input file and the computation data input file and obtaining at least one second result file, a second module for comparing the at least one first result file and the at least one second result file, a module for deleting the first and second result files and sending an error message to the user if the result of this comparison is negative.

12. Aircraft according to claim 10, which comprises:

a module for verifying data integrity control algorithms established on modules for computing the flight manual, and on configuration files used by it.

13. Aircraft according to claim 10, which comprises:

a module for verifying, after reading the input files, data integrity control algorithms established on these input files, prior to each computation step.

14. Aircraft according to claim 13, which comprises:

a module for verifying, after writing the result files, data integrity control algorithms established on these input files, after each computation step.

15. Aircraft according to claim 11, which comprises:

a module for checking the comparison module performing the second comparison step, before it performs said second comparison step.

16. Aircraft according to claim 12, wherein each data integrity control algorithm is a 32-bit checksum.

17. Aircraft according to claim 10, wherein the operating system is the Windows system.

18. Aircraft according to claim 10, wherein the aircraft is an airplane.

* * * * *